Sept. 3, 1935. R. H. LAWSON ET AL 2,013,563
WEB TRANSFERRING MECHANISM AND TAKE-UP
Filed Jan. 30, 1931    8 Sheets-Sheet 1

INVENTORS:
ROBERT H. LAWSON,
AUGUSTIN GAGNÉ,
BY Roy F. Lovell,
ATT'Y.

Sept. 3, 1935.    R. H. LAWSON ET AL    2,013,563
WEB TRANSFERRING MECHANISM AND TAKE-UP
Filed Jan. 30, 1931    8 Sheets-Sheet 2

INVENTORS:
ROBERT H. LAWSON,
AUGUSTIN GAGNE,
By Roy F. Lovell,
ATT'Y.

Sept. 3, 1935.    R. H. LAWSON ET AL    2,013,563
WEB TRANSFERRING MECHANISM AND TAKE-UP
Filed Jan. 30, 1931    8 Sheets-Sheet 4

INVENTORS:
ROBERT H. LAWSON,
AUGUSTIN GAGNE,
BY Roy F. Lovell
ATT'Y.

Sept. 3, 1935. R. H. LAWSON ET AL 2,013,563
WEB TRANSFERRING MECHANISM AND TAKE-UP
Filed Jan. 30, 1931 8 Sheets-Sheet 5

INVENTORS:
ROBERT H. LAWSON,
AUGUSTIN GAGNE,
By Roy F. Lovell,
ATT'Y.

Sept. 3, 1935.   R. H. LAWSON ET AL   2,013,563
WEB TRANSFERRING MECHANISM AND TAKE-UP
Filed Jan. 30, 1931   8 Sheets-Sheet 7

INVENTORS:
ROBERT H. LAWSON,
AUGUSTIN GAGNE,
BY Roy F. Lovell,
ATT'Y.

Patented Sept. 3, 1935

2,013,563

UNITED STATES PATENT OFFICE 2,013,563

WEB TRANSFERRING MECHANISM AND TAKE-UP

Robert H. Lawson, Pawtucket, and Augustin Gagné, Central Falls, R. I., assignors to Hemphill Company, Central Falls, R. I., a corporation of Massachusetts Application January 30, 1931, Serial No. 512,386

13 Claims. (Cl. 66—148)

This invention relates to a new and improved mechanism for transferring tops to half hose or other stockings which mechanism includes fabric take-up means although the latter may be used alone, i. e., not in combination with the other elements constituting the transfer mechanism. As herein shown the transfer means is used in connection with a machine of the Banner type similar to the machine disclosed in the patent to Hemphill 933,443, September 7, 1909.

The knitting machine includes any suitable form of needle cylinder 1, preferably of the rotary type, mounted within the circular base 2 which carries any suitable form of driving means for imparting rotary movements to the said needle cylinder.

Figures 1, 2:
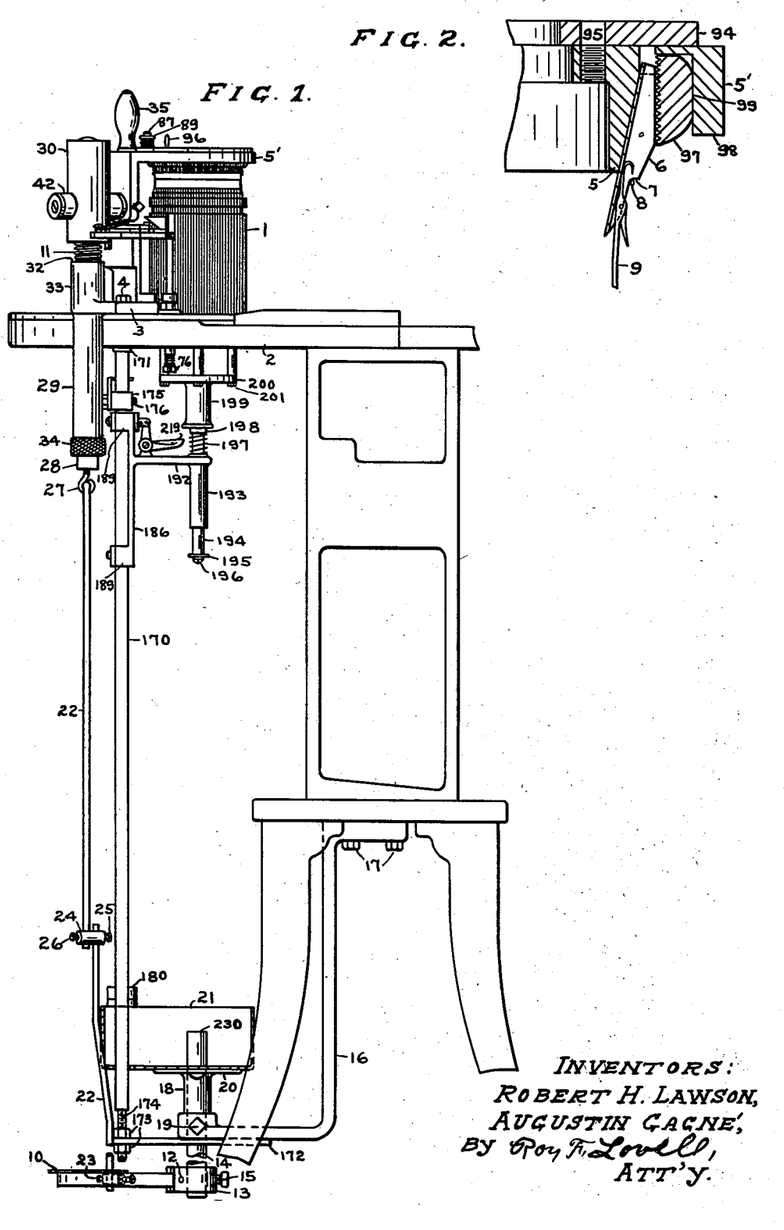
Fig. 1 is a view in vertical, front elevation of a knitting machine showing the transfer means in position to transfer stitches to the raised needles, and including a grab take-up within the needle cylinder to engage a rib top and assist in the transfer of the rib top to the needles.
Fig. 2 is a detail enlarged view showing the relation between a transfer point or quill and its needle when a stitch is about to be transferred from the transfer point to the needle.

The transfer mechanism includes a bracket 3 provided with elongated slots 3'. The bracket 3 is adjustably mounted upon the circular base 2 by means of screws or bolts 4 which pass through the slots 3' and into engagement with the circular base 2. The transfer mechanism includes a transfer or quill ring 5, which is mounted in and carried by a bracket 5' and has angularly disposed therein in the usual manner, as shown in Fig. 2, transfer points or quills 6. The transfer points 6 are more or less cup shaped in cross section as indicated in Fig. 2, and midway of their lengths are provided with shoulders 7 which act as seats or stops for the stitches 8 which are to be transferred to the needles 9 which are of the pivoted latch type, one of the needles being shown in Fig. 2. The specific constructions of the transfer ring and points 6 are not necessarily a part of the present invention and will not be described in detail.

Figures 3, 4, 5:
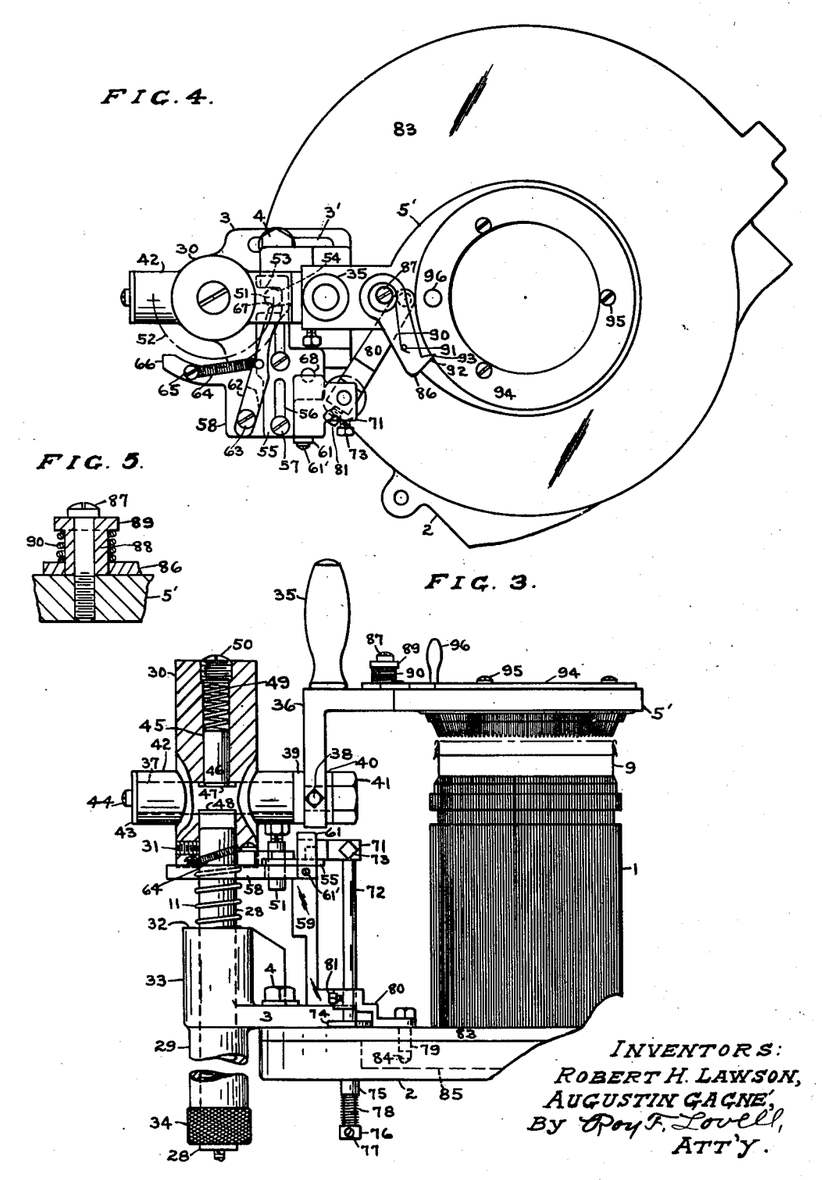
Fig. 3 is a view showing a portion only of the mechanism shown in Fig. 1, but upon an enlarged scale, partly in section and with the transfer ring in the position it occupies either just before the stitches are to be transferred to the needles or just after the stitches have been transferred thereto.
Fig. 4 is a plan view of the mechanism shown in Fig. 3.
Fig. 5 is a view of a detail in section.

When the stitches have been transferred to the needles by the transfer points 6 moving downwardly to the position indicated by a single needle in Fig. 2, transfer ring 5 is elevated from the position shown in Figs. 1 and 2 to a position slightly above the needle tops such as that shown in Fig. 3 and this upward movement of the transfer ring 5 is automatically accomplished when the operator takes his or her foot off a pedal 10, whereupon a coil spring 11 elevates the transfer ring 5 to the position shown in Fig. 3.

The pedal 10 is pivoted as at 12 to a split sleeve or collar 13 which is adjustably retained lengthwise of a rod 14 as by means of a set screw 15. The rod 14 is in turn adjustably mounted in an angle bracket 16 which depends from and is secured to the underside of the machine frame as by screws 17, the rod 14 being adjustably mounted in the bracket 16 by passing axially through a sleeve 18 carried by the said bracket and adjustably retained in position by means of a set screw 19. The sleeve 18 terminates in a plate 20 to which is secured a basket or stocking retainer 21. Adjustably passing through the pedal 10 or to a member connected thereto is a two-part wire or other link 22 which is retained in adjusted position as by means of a set screw 23. The two parts of the link 22 both adjustably pass through holes provided in a bushing or link 24, the said two parts of the link 22 being adjustably retained in position as by means of set screws 25 and 26. The upper end of the link 22 is hook shaped and is interengaged with a companion hook 27 which screws into and is made part of a sliding rod 28 passing axially through an elongated sleeve or boss 29 which depends from and forms part of bracket 3. To the upper end of the rod 28 is made fast a bracket 30 as by means of a set screw 31 (Fig. 3). The coil spring 11 bears at one end upon the upper surface 32 of a boss 33 which upstands from and forms part of plate 3 and at its other end bears against the underside of the bracket 30, whereby when the operator releases or removes a foot from the pedal 10 the spring 11 expands and elevates the bracket 30 which carries the transfer ring 5, the upward movement of bracket 30 being limited by a collar 34, fast to rod 28, engaging the lower face of boss 29.

The transfer ring 5 is provided with an operating handle 35 by means of which the said transfer ring may be rotated on a horizontal axis and also on a vertical axis. Adjacent to the handle 35 is an arm 36 which forms part of the transfer ring, the arm being secured to a horizontally disposed shaft 37 as by means of a set screw 38. The shaft 37 is prevented from moving through the arm 36 by means of a collar 39 which is integral with the shaft 37 and abuts one face of the depending arm 36, while abutting the other face of the arm 36 is a washer 40 held in place against said face by means of a nut 41 which threadedly engages a reduced and threaded end (not shown), of the shaft 37. The shaft 37 is received within a sleeve 42, which is integral with or is otherwise connected to and forms part of bracket 30. The sleeve 42 provides a bearing for the shaft 37 which is prevented from moving lengthwise of the said sleeve or bearing 42 by means of the aforesaid collar 39 being seated against one end of said sleeve and a washer 43 which is seated against the other end of the sleeve and fastened to the shaft 37 by means of a set screw 44. The bracket 30 is provided with a longitudinally extending hole or boring 45 within which is received a pin 46 which pin at its lower end is adapted to engage or seat against either one of two flat portions 47, 48 of shaft 37. The pin 46 is shown in Fig. 3 seated against one such flattened portion 47 to retain the transfer ring in the position shown in Fig. 3 with the transfer points pointing downwardly, while in Fig. 6 the said pin 46 is shown as seated against the other such flattened portion or surface 48 of the shaft 37 to retain the transfer ring with the points thereof extending upwardly so that a rib top may be transferred thereto. The pin 46 is normally maintained in contact either with the flat 47 or the flat 48 as by means of a coil spring 49 which is seated within the boring 45 above the pin 46 and which spring is maintained more or less compressed by means of a screw 50 engaged in the upper, threaded portion of the boring 45.

Figures 6, 7, 8:
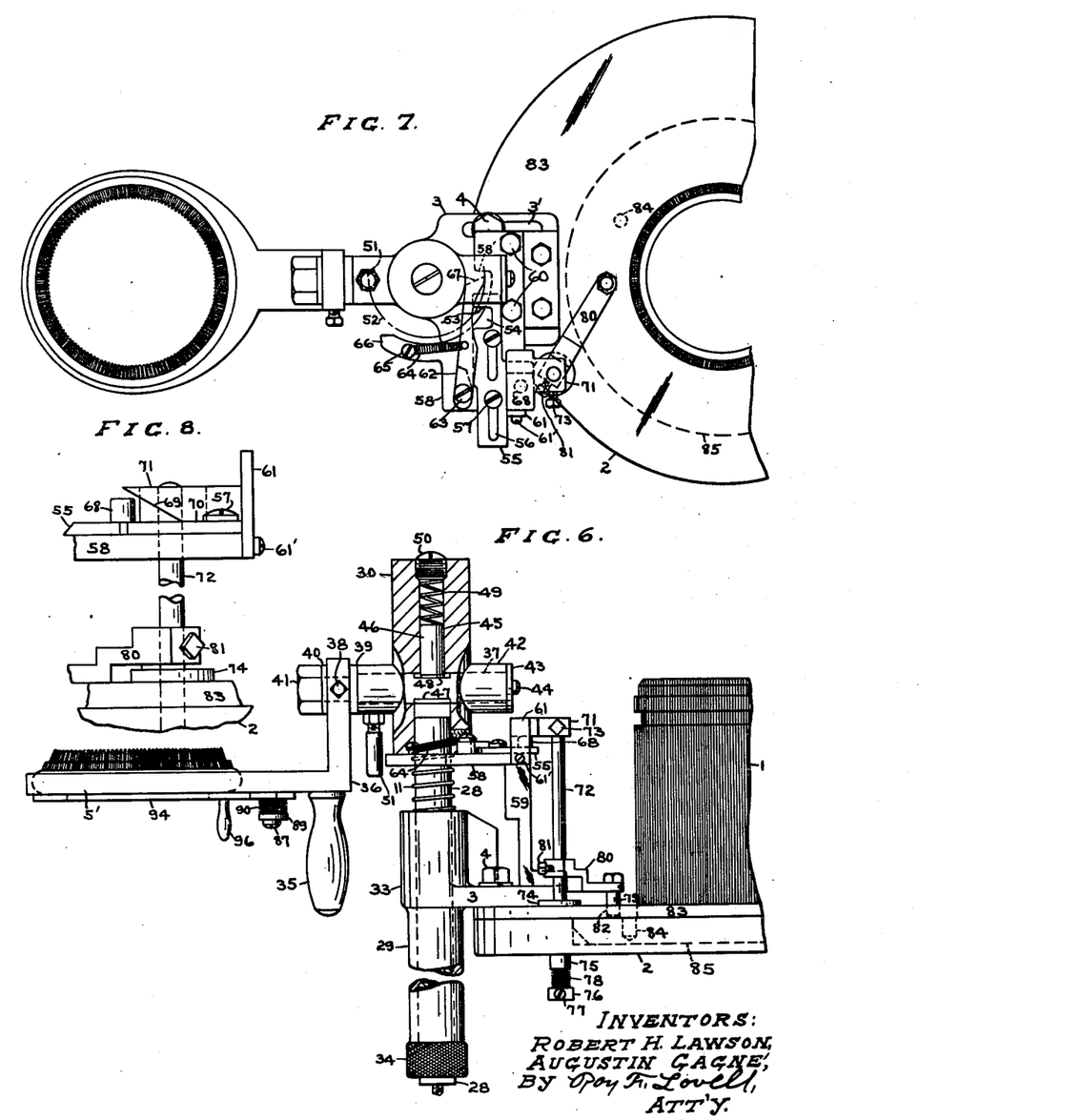
Fig. 6 is a view similar to Fig. 3, but showing another phase of the cycle of operations.
Fig. 7 is a plan view of the parts shown in Fig. 6.
Fig. 8 is a fragmentary view, upon an enlarged scale, of a detail shown in Figs. 3, 4, 6 and 7.

In addition to the movements of the transfer ring on a horizontal axis, the said ring is also movable on a vertical axis defined by the shaft 28, whereby the transfer ring may be swung from a position over the needle cylinder shown in Fig. 3, to a position shown in Fig. 6 substantially 180 degrees removed from the first position.

When the transfer ring is moved from the position shown in Fig. 6 to that shown in Fig. 3, the handle is grasped and the transfer ring 5 is first moved or rotated on a horizontal axis so as to lie in a plane above that defined by the tops of the cylinder needles, and thereafter the transfer ring is swung on a vertical axis to the position shown in Fig. 3 and when so swung or moved the construction and relation of the parts and their operation is as follows:

A pin 51, Fig. 6, moves substantially in the arc of a circle from the position shown in Fig. 6 to that shown in Fig. 3, the arc of the circle being indicated by dot and dash lines 52, Fig. 7. Near the end of its circular movements the pin 51 engages an edge 53 which defines one side of a slot 54 provided in a longitudinally slidable plate 55. The said plate 55 is provided with longitudinal slots 56, screws or pins 57 passing through said slots and into threaded engagement with a plate 58 which plate is attached to a stationary upright bracket 59 as by screws 60. To the plate 58 is also attached a rectangular piece 61 as by means of a screw 61', the piece 61 serving to guide the sliding plate 55 and also to function in a manner hereinafter to be more fully described. When the pin 51 strikes the edge 53 of the plate 55 it cams or moves the said plate lengthwise of the slots 56 until the said pin engages an edge 58' of the plate 58 which edge 58' serves as a stop to limit the swinging movement of the transfer ring when the said transfer ring is properly positioned over the needles of the needle cylinder. During its circular movements along the dot and dash line 52 the pin 51 engages and wipes against a detent 62 which detent is pivoted to the plate 58 at 63, to which plate is attached at one end a coil spring 64, the other end of said spring being attached to a pin 65 carried by an arm 66 extending outwardly from the plate 58. When the pin 51 finally reaches the position of Fig. 4 it is centered, and the transfer ring is prevented from movement by the said pin 51 being retained between the edge 58' and a bevelled edge 67 which forms the end of the detent 62. Although as stated the pin 51 is confined in the position shown in Fig. 4, nevertheless engagement and movement of the handle 35 suffices to turn the transfer ring and cause the pin 51 to move the detent 62 against the tension of the spring 64 so that the transfer ring may be swung from the position shown in Figs. 3 and 4.

Carried by an extension of the plate 55 is an upstanding pin 68 which, due to the pin and slot connection 56, 57, hereinbefore described, is adapted to move, by which movements the pin 68 is adapted to engage an inclined cam face 69 which terminates in a flat face 70. The faces 69 and 70 constitute the lower faces of a block 71 to which is attached a vertically disposed rod 72 by means of a set screw 73. The rod 72 is adapted to be moved longitudinally, the lower end thereof passing through the circular base 2 and being supported for sliding movements therethrough by means of a collar 74 and a sleeve 75. To the lower end of the rod 72 is affixed a collar 76 by means of a set screw 77. Engaging at one end the upper face of the collar 76 and at its other end the lower face of the sleeve 75, is a coil spring 78. The coil spring 78 normally tends to lower the rod 72 and thereby the block 71, consequently maintaining the block 71 in the position shown in Fig. 8 until the said block is engaged and raised by the pin 68 in the manner hereinbefore described.

The hereinbefore described movements of the pin 51 from the position shown in Figs. 6, 7 to that shown in Figs. 3, 4 cause the plate 55 and consequently the pin 68 to move from under the block 71, whereby the spring 78 depresses the rod 72 until a pin 79 depending from and carried by an arm 80, which is in turn attached to the rod 72 as by means of a set screw 81 (Figs. 3 and 6), seats in a hole 82 provided in the so-called ring gear plate 83, the pin 79 remaining in an elevated position until the needle cylinder is turned to such a position that the hole 82, and a recess or hole 84 in the ring gear 85, register, whereupon the spring 78 causes the pin 79 to drop or snap into the hole 84 in the ring gear 85 and thereby lock the needle cylinder and transfer ring in the desired relative positions for transfer.

In addition to guiding the plate 55 in its sliding movements the rectangular piece 61 also serves, by engaging the block 71, to prevent the same from turning on a vertical axis.

From the foregoing description it will be understood that the transfer ring, at the completion of transfer, may be, by engaging the handle 35, rotated, first, on a vertical axis until the said transfer ring is disposed in the circumferential relation with respect to the needle cylinder shown in Figs. 6 and 7, the said transfer ring then being adapted to be moved on a horizontal axis to the position shown in said figures, whereby another ribbed top may be transferred to the points 6 of the transfer ring. Thereafter, when a stocking has been knitted and the needles 9 are moved to the position shown in Fig. 3, the transfer ring with a ribbed top (not shown) carried thereby may be, first, rotated on a horizontal axis as hereinbefore described, and then swung on a vertical axis until the transfer ring is in a position shown in Fig. 3, whereupon engagement of the pin 51 with the plate 55 causes the pin 68 to be moved out from engagement with the flat face 70 of the block 71 so that the spring 78 may cause the pin 79 to snap into the recess or hole 84 when the needle cylinder is subsequently rotated. Thereafter depression of the pedal 10 causes the transfer points to overlap the needles as indicated in Fig. 2.

When the transfer ring 5 is initially applied to the knitting machine it is necessary that the transfer points 6 be centered directly over the cylinder needles to which the said transfer points are to transfer stitches. Consequently some means must be provided to center, and maintain centered, the transfer points and needles, and this is accomplished as herein disclosed (Figs. 3, 4 and 5) by means of a detent 86 which is pivotally mounted upon the upper face of the transfer ring bracket 5' and on a pin or screw 87 which passes through an eccentric sleeve 88 which is provided with a head 89. The eccentric sleeve 88 passes through a hole provided in the detent 86 and, when the screw 87 is loosened, the eccentric sleeve 88 may be turned manually so that the detent 86 may be properly seated in position for a purpose hereinafter to be described. When the eccentric 88 is properly positioned, the screw 87 is tightened whereupon the eccentric is locked or prevented from turning. A coil spring 90, which has an end in engagement with a pin 91 carried by and adjacent to the free end of the detent 86, is coiled around the eccentric 88 between the collar or shoulder 89 and the upper face of the detent 86, whereby an end 92 of the said detent is adapted to engage within a notch 93 subsequently cut in the periphery of a ring 94 which is mounted upon the upper face of and is attached to the transfer ring 5 as by screws 95. By "subsequently cut" is meant cut subsequently to the applying of the transfer mechanism to a knitting machine and before tops are transferred to the needles, the detent 92 and notch 93 thereafter maintaining the transfer ring and needles 9 in alignment throughout subsequent transferring operations after such alignment has once been definitely determined or established by moving the ring 94 and transfer ring by means of a handle 96.

The transfer ring has been hereinbefore referred to generally by the reference numeral 5 although, as shown in Fig. 2, the said transfer ring 5 includes transfer points 6 which are retained in position by means of a ring 97, the said ring 97 and points 6 being centralized by means of a depending, cup-shaped flange 98 of the transfer bracket 5' which engages a flat face 99 of the ring 97.

In Figs. 9, 10, 11, 12, 13 and 14 there is disclosed a transfer means modified somewhat with respect to that hereinbefore disclosed. In the said figures is shown a needle cylinder 100 which corresponds to the needle cylinder 1 hereinbefore disclosed although it is somewhat longer so that jacks may be used to select needles as desired for various purposes. The needle cylinder is mounted upon a circular base 101 and mounted upon and carried by the said circular base is a modified form of transfer means designated generally by the reference numeral 102 and including a transfer ring 103 which is mounted within and carried by a transfer ring bracket 103'. Within the transfer ring are mounted transfer points 104 which are adapted to transfer stitches to needles 105 in the manner hereinbefore disclosed. A pedal or other means similar to the pedal 10, Fig. 1, is utilized to depress the transfer points 104 to the position shown in Fig. 2, to transfer stitches to the needles 105, the pedal or other means acting to pull down or depress a link 106. The link 106 is connected to a rod 107 to the upper end of which is connected a bracket 108 by means of a set screw 109, the said bracket being bored or recessed and receiving therein the upper end of the rod 107. A horizontally disposed portion of the bracket 108 is provided with a hole extending therethrough and received therein is a shaft 110, one end of which projects through the said horizontal portion of the bracket 108, to which end is affixed the bracket 103', a shoulder or flange 111 of the said bracket and a washer 112 engaging opposite faces of an extension of the said bracket 103'. The shaft 110 passes through an elongated slot provided in said extension of the bracket 103', the said shaft 110 being adjustably retained in a desired position longitudinally of the slot by the shoulder 111 engaging an adjacent face of the bracket 103', while the washer 112 engages the other face thereof, a nut 113 causing the shoulder 111 and washer 112 to engage opposite faces of the bracket extension and maintain the same in the desired position of vertical adjustment with respect to the cylinder needles. The coil spring 114 at one end engages shoulder 111 and at its other end bears against an adjacent face 115 of the bracket 108 and thereby maintains the transfer bracket 103' in an outward position, i. e., away from the bracket 108. The other end of the shaft 110 has attached thereto by means of a set screw 116 a centering head 117, which head is provided with projections 118 having flats and with recessed portions 119, the projections 118 being adapted to seat in correspondingly shaped recesses provided in the bracket 108, while the recesses are engaged by correspondingly shaped projections on the bracket 108. The head 117, which is in the form of a sleeve, is prevented from moving lengthwise of the shaft 110 by means of a cap plate 120 which is retained in position against the outer face of the head 117 as by means of a set screw 121 which passes through the said cap 120 and into threaded engagement with the shaft 110.

To provide for movements of the transfer ring 103 and the bracket 103' on a vertical axis, a bracket plate 122 is made fast to the shaft 107 as by means of a set screw 123. Through outer or peripheral portions of the bracket or plate 122 there pass two pins or rods 124, 125. Engaging the lower face of the plate 122 is a coil spring 126 which at its other end is in engagement with a plate 127 which is attached to and carried by the circular base 101. Mounted upon and slidably connected to the plate 127 is a plate 128 which is provided with slots 129 through which pass pins or screws 130 and by means of which the plate 128 is slidably attached to the plate 127. The plate 128 is provided with a recess 131 which is adapted to be engaged by pin 125 when the transfer bracket 103' is moved from a position corresponding to that shown in Figs. 6 and 7 to the position shown in Figs. 9 and 10, the pin during such movements moving in a circular path and by engaging an edge 132 of the notch 131, causing the plate 128 to slide longitudinally to the position shown in Fig. 10 in which position a pin 133 (Fig. 14), carried by the outer end of the plate, 128 moves from under a horizontal face 134 of a block 135. The block 135 is attached as by means of a set screw 136 to a short pin 137 to the upper end of which is also connected, as by means of a set screw 138, an arm 139 which projects laterally (Fig. 10) from a position adjacent to the outer periphery of the circular base to a position adjacent to the needle cylinder and over a ring gear 140 which drives the needle cylinder in a customary manner. The end of the arm 139 adjacent to the needle cylinder extends downwardly and carries, at the end of the extension, a pin 141. The pin 137 extends downwardly through a hole provided in the circular base and to the projecting end of the said pin is attached a collar 142 as by means of a set screw 143. Bearing upon the upper face of the collar 142 is one end of a coil spring 144, the other end of which bears against a sleeve 145 which sleeve is part of a plate 146, the latter being attached to the circular base 101 in any suitable manner.

Figures 9, 10:
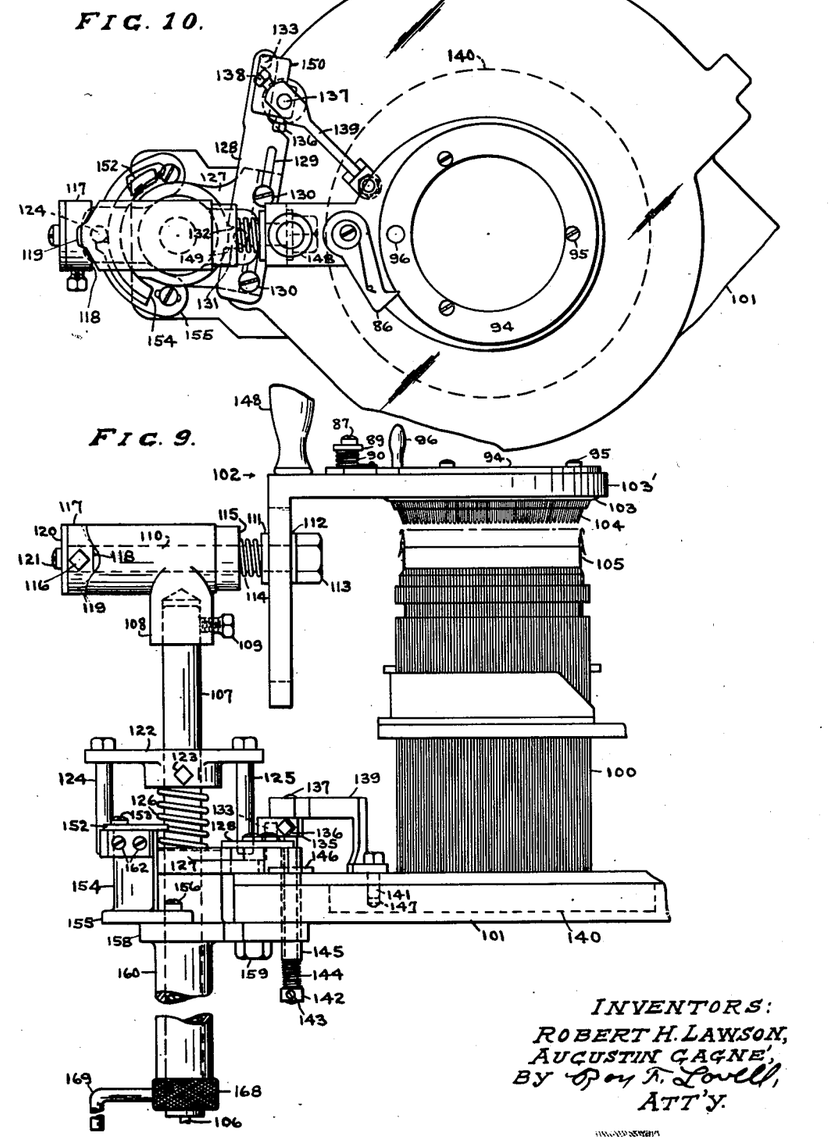
Fig. 9 is a view similar to Fig. 3, but showing a modification.
Fig. 10 is a plan view of the modification shown in Fig. 9.
Figure 14:
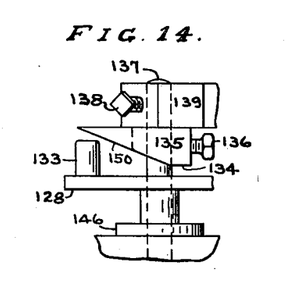

From the foregoing description it will be evident that when the pin 133 is moved to the position shown in Figs. 10 and 14, the pin 137 and consequently the arm 139 and pin 141, are released and are thereafter under the influence of the spring 144 which tends to move the parts in a downward direction, such movement being resisted by the ring gear 140 until a hole or recess 147 therein is brought around beneath the pin 141, when the needle cylinder is rotated after the transfer ring has been moved to the position shown in Figs. 9 and 10, whereupon under the influence of the spring 144 the pin 141 snaps into the hole or recess 147 in the ring gear 140.

Figure 11:
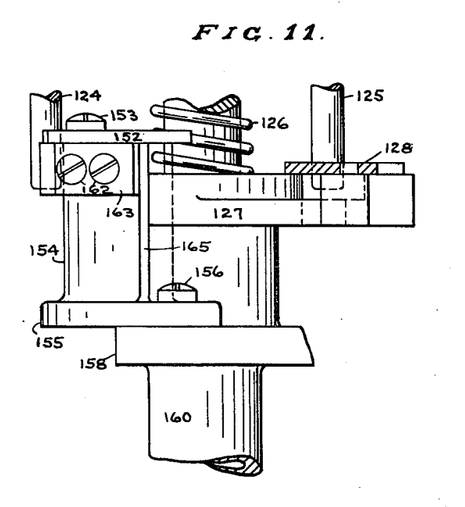
Figs. 11, 12, 13 and 14 are fragmentary detail views of the modification shown in Figs. 9 and 10.
Figure 12:
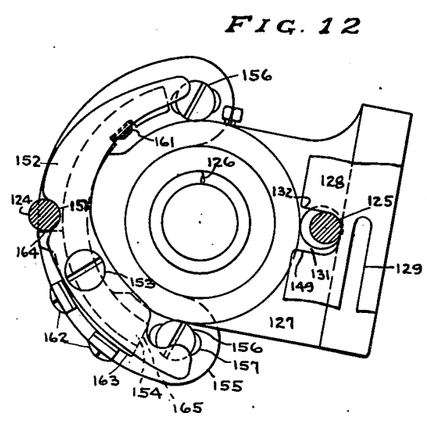
Figure 13:
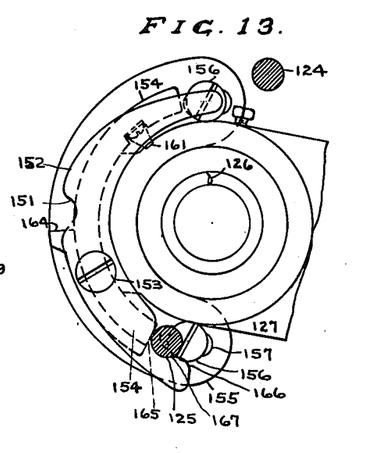

The positions of the parts as shown in the fragmentary views, Figs. 11 and 12, are the same as the positions shown in Figs. 9 and 10, while the fragmentary view shown in Fig. 13 corresponds to the circumferential position of the transfer ring shown in Figs. 6 and 7.

At the completion of the transferring operation which is accomplished by depressing a pedal similar to the pedal 10, Fig. 1, the said pedal is released and thereupon the spring 126 raises the shaft 107, the transfer ring bracket 103' and transfer ring 103 then again being in the position shown in Fig. 9, whereupon a handle 148 is gripped and the transfer ring bracket 103' and transfer ring 103 are swung through an angle of approximately 90 degrees more or less, the pin 125 meanwhile engaging an edge 149 which defines one side of the slot or recess 131. Engagement of the edge 149 by pin 125 causes the sliding plate 128 to be moved in such a manner that the pin 133 engages an inclined face 150 of the block 135 and thereby elevates the block as well as the parts connected thereto which include the pin 141, whereby the said pin 141 is removed from engagement with the recess 147 in the ring gear 140 and the ring gear again permitted to revolve. Rotation of the transfer bracket and consequently the pins 124, 125 carried thereby or movable therewith, withdraws the pin 124 from engagement with a centering notch 151 provided in the outer edge of an arc-shaped plate 152, which plate 152 is attached by means of a screw 153 to an arcuate upright plate 154 integral with a horizontally disposed and arcuate plate 155. Plate 155, by means of screws 156 engaging slots 157 in said plate, is adjustably connected to a plate 158 which is attached to the underside of the circular base 101 as by means of a screw 159.

The plate 158 additionally serves to provide a bearing and support for the sleeve 145 which passes therethrough, and by means of an integral sleeve 160, which depends from the plate 158, also serves laterally to support the rod or shaft 107 which passes down axially through the said sleeve 160.

The connection 153 between the plate 152 and the arcuate plate 154 is a pivotal one and when the pin 124 is in the position shown in Figs. 10 and 12 a leaf spring 161, which is attached to the arcuate plate 154, at its upper end engages the inner edge of the plate or lever 152 and tends to rock that arm of the same outwardly and thereby maintain close engagement between the notch 151 and the pin 124. When the transfer bracket, and consequently the pin 124, are moved through an angle of 90 degrees as aforesaid, the pin 124 forces the plate or lever 152 to the right, Fig. 12, against the tension of the spring 161. The said spring 161, however, when the pins 124 and 125 reach the position shown in Fig. 13, tends to move the said plate or lever 152 in the direction of the said pin 125 and thereby maintains a firm engagement between the pin 125 and plate 152. Attached to the outer face of the arcuate plate 154 by screws 162 is a plate 163, on one end of which plate is provided a vertical face 164 which acts as a stop to limit the throw or movement of the pin 124 in that direction, while an end 165 of plate 154, Fig. 13, with which the pin 125 is in engagement, acts as a stop to limit the throw or movement of the pin 125 in the opposite direction, the pin 125 when moving in the said opposite direction engaging the end 166 of lever 152 and forcing said end outwardly against the tension of spring 161, and then snapping into the notch 167 where it is held by and between stop 165 and the end 166 of lever 152. Furthermore the spring 161 tends to resist movement of the pin 125 in a clockwise direction, Fig. 13.

The means for adjusting the transfer ring circumferentially with respect to the needles prior to initially transferring rib tops to the needles, is disclosed in Fig. 10 and is identical with the means for the same purpose which is designated in Figs. 3, 4 and 5 by the reference characters 86–96 inclusive.

Briefly summarized the transfer operation is substantially as follows: The transfer ring 5 and bracket 5' are moved from a position such as that shown in Fig. 6, first, by engaging the handle 35 and moving the said transfer ring and bracket on the horizontal axis, the transfer ring and bracket then being swung on the vertical axis to a position such as that shown in Fig. 3, the movement on the vertical axis causing the pin 51 to move the plate 55 from the position shown in Fig. 7 to that shown in Fig. 4, whereupon the needle cylinder centering means, which includes the pin 79, are released by withdrawal of pin 68 from engagement with the cam 71 at 70 (see Fig. 8). Thereafter, unless the recess 84 is in register with the pin 79, the needle cylinder is turned manually until the said recess 84 does register with the pin 79, whereupon the spring 78 causes the said pin 79 to snap into the recess 84 thus locking the needle cylinder and preventing inadvertent turning of the same. Finally, after the pin 79 by engaging the recess 84 has centered the needles of the needle cylinder with respect to their companion transfer points, the operator depresses the pedal 10 which moves the transfer ring 5 and bracket 5', against the tension of the spring 11, from a position such as that indicated in Fig. 3 to the position shown in Fig. 2, in which latter position the stitches 8 are in position to be engaged by the needles 9, when the stitches are removed from the transfer points by means specifically disclosed in Figs. 15–25 inclusive and hereinafter to be described.

Although the brief description of operation has referred specifically to the construction disclosed in Figs. 1–8 inclusive, nevertheless the operation of transferring fabric by the mechanisms specifically disclosed in Figs. 9–14 inclusive, is substantially the same.

Although the transfer mechanisms hereinbefore described, are preferably used to transfer ribbed tops to circular hosiery machines of the Banner type, their use is not necessarily so limited but they may be used with knitting machines of any type and for any purpose.

The form of transfer mechanisms specifically disclosed in Figs. 10–14 inclusive is desirable when needle selecting jacks are located beneath the needles and in the grooves of the needle cylinder. When using jacks, they are ordinarily removed and replaced by others, when a change in pattern is desired or for other purposes, adjacent to the place on the circular base where the transfer mechanisms are attached to the said circular base. And in order to replace jacks, it is necessary to disconnect the transfer mechanisms so that the jacks may be readily taken out and others inserted in their place within the grooves of the needle cylinder. The transfer means specifically disclosed in Figs. 10–14 readily lends itself to the replacement of jacks in that the said transfer mechanisms may be disconnected from the circular base by removing a collar 168 which collar is normally retained in position on shaft 107 by means of a set screw which terminates in a handle 169. Removal of collar 168 from shaft 107 permits the transfer mechanism to be bodily removed from the machine.

In Figs. 1 and 15–25 inclusive there is specifically disclosed a means for engaging rib tops when they are initially transferred to the needles of a knitting machine as by the mechanism hereinbefore described and specifically disclosed in Figs. 1–14 inclusive, although the means (Figs. 15–25) in addition to functioning in cooperation with the transfer mechanisms hereinbefore described, also acts as a take-up in that it continues to engage the fabric and thereby tension the same throughout the knitting of the stocking.

The means which cooperates with the transfer means in the manner set forth, includes a rod 170 which depends from the circular base 2 being secured to the underside thereof as by means of a plate or bar 171 which plate or bar is connected to the underside of the base 2 by any suitable means. The lower end of the rod 170 is prevented from vibrating by means of an arm 172 which is attached at one end to the rod 170 by means of nuts 173 in threaded engagement with a threaded end 174 of the shaft 170 and engaging between them the said arm 172. The other end of the arm 172 is attached to the bracket 16 by any suitable means.

Attached to the rod 170 adjacent to its upper end is a combined pulley bracket and stop 175 which is made fast to the rod 170 and prevented from movement thereon by means of a set screw 176. Attached to the free end of the bracket 175 is a pulley 177 around which passes a chain 178 to one end of which is connected a short rod 179 removably mounted upon which are counterbalance weights such as 180; while the other end of the chain 178 is adjustably connected to a hook 181. The hook 181 is, preferably, made of a piece of bent wire the end opposite the hook being in the form of an eye encircling the threaded shank 182 at one end of a short rod or pin 183 the other end of which pin is also threaded and is removably engaged by a head 184. The end 182 is in threaded engagement with a lug 185 which is attached to and projects laterally from a bracket 186 which is slidably mounted upon rod 170. A nut 187 is also in threaded engagement with the end 182 of the pin 183 and serves to clamp and hold, more or less rigid, the portion of the hook member 181 that encircles the threaded end 182. Weights 188 may be removably mounted upon the pin 183 if the character of fabric knitted requires an extra amount of tension, the weights 180 serving to counteract or counterbalance, to some extent, the weight of the bracket 186 and parts carried thereby. However, both or either weights 180 and 188 may be dispensed with if desired.

As hereinbefore stated the bracket 175, in addition to serving as a means for supporting the pulley 177, also acts as a stop to limit the upward movements or throw of the bracket 186.

The bracket 186, which supports web engaging means hereinafter to be described, includes an elongated strip or shank portion both ends of which are provided with arms 189 which straddle the rod 170, the arms 189 at each end of the bracket 186 being connected by means of plates 190 which are secured to the respective arms as by means of screws 191, the bracket 186 at both ends thus completely encircling the rod 170.

Figures 22, 23, 24, 25:
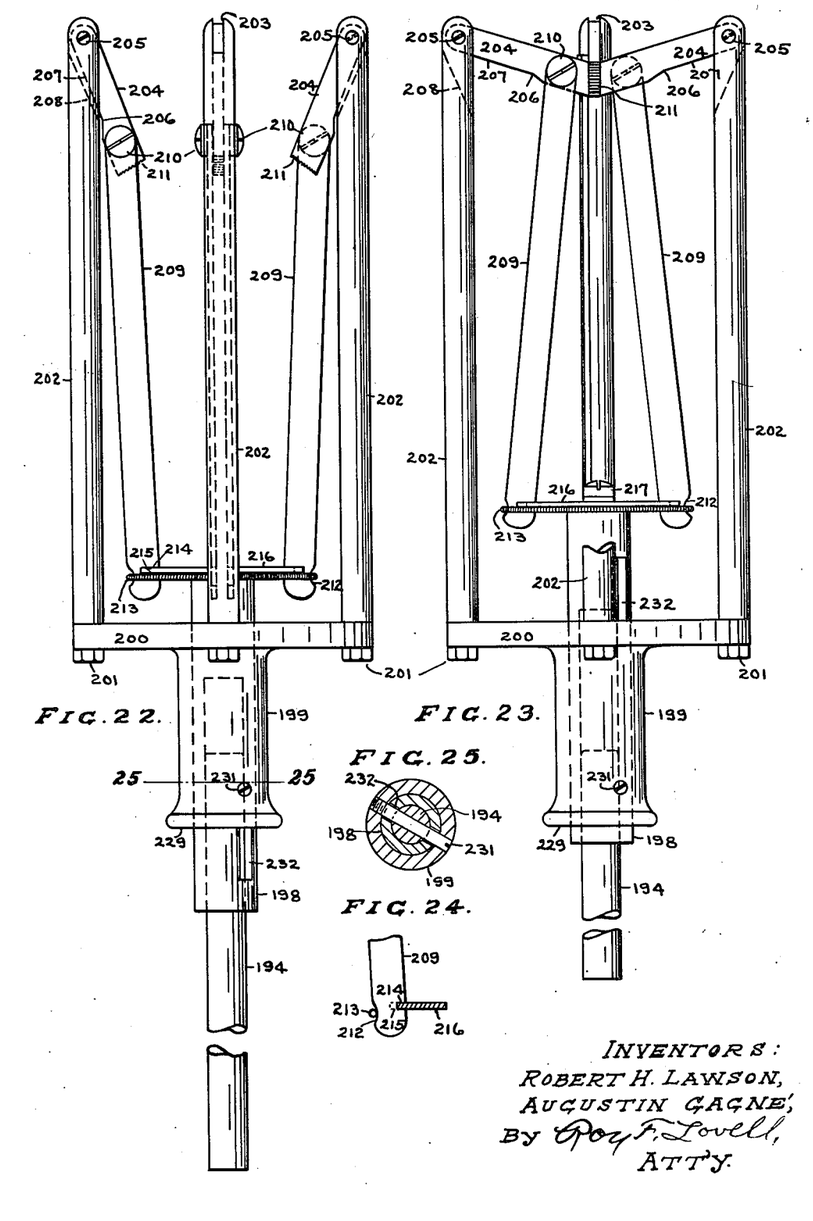
Fig. 22 is an enlarged detail view showing the jaws or clamps, for engaging the fabric, in an open position such as that shown in Fig. 20.
Fig. 23 is a view similar to Fig. 22 but showing the grab take-up in the position shown in Fig. 21.
Fig. 24 is a fragmentary view of a detail, in section.
Fig. 25 is a view in section taken along the line 25—25, Fig. 22.

An arm 192, connected to or integral with the bracket 186, projects laterally therefrom intermediate the ends thereof and is provided at its outer end with an integral and downwardly extending sleeve 193 through which passes a shaft 194 having at the lower end thereof a washer 195 which loosely encircles the shank of a screw 196 itself in threaded engagement with a hole provided in the lower end of the shaft 194. The washer 195 serves the purpose of limiting the upward movement of the shaft 194. A coil spring 197 at one end engages the upper face of the free end of the arm 192 and at its other end engages and tends to force upwardly a sliding rod or shaft 198 which passes upwardly through, and in its sliding movements is guided by, a sleeve 199 which sleeve constitutes the lower extremity of a supporting bracket 200 upon the upper face of which are removably mounted, as by nuts 201, upright posts 202, the upper ends of which are bifurcated as at 203 (Figs. 22, 23) and between which bifurcations, arms or links 204 are pivotally mounted upon pivot pins or screws 205. Each link 204 is notched on its underside as at 206, the purpose of the notches 206 being to permit the arms 204 to extend downwardly at the desired angle as shown in Fig. 22, in which position the lower portions of the lower cut-away edges 207 of the links 204 seat against the inclined seats 208 provided by the bifurcations 203. To the free ends of the arms 204 are pivotally connected other arms 209, the pivotal connections consisting of pins or screws 210. The free ends of the arms 204 are serrated as at 211 to provide cloth-engaging teeth for effectively gripping the knitted stocking, half hose or other fabric. The lower ends of the arms 209 are notched as at 212 and within the said notches is seated a coil, compression spring 213 which tends to move the lower ends of the arms inwardly, i. e., towards the center of the bracket 200, the lower ends of the said arms 209 being notched as at 214 which notches interlock with corresponding notches 215 provided in the peripheral edge of a plate 216. The plate 216 is attached to the upper surface of the shaft or sleeve 198 as by means of a screw 217. As hereinbefore stated the spring 197 normally tends to move the sleeve 198 to the position indicated in Fig. 15. When the sleeve 198 is moved from the position shown in Fig. 22 to that shown in Fig. 23 (which corresponds to the position shown in Fig. 15) the interengagements of the notches 214 and 215 causes the arms 204 to move upwardly from the position shown in Fig. 22 to that shown in Fig. 23, in which latter position the teeth 211 engage the fabric as indicated in Fig. 15.

Pivotally mounted upon the upper face of the arm 192 at 218 (Fig. 19) is a bell crank lever or detent 219 to one arm 220 of which is pivotally connected at 221 a locking pin 222, the said pin being urged towards the bracket 186 by means of a spring 223 coiled around the pivot 218, an end of said spring engaging under a pin 224 fast to and projecting laterally from the other arm 225 of the detent 219.

Figures 15, 16, 17, 18:
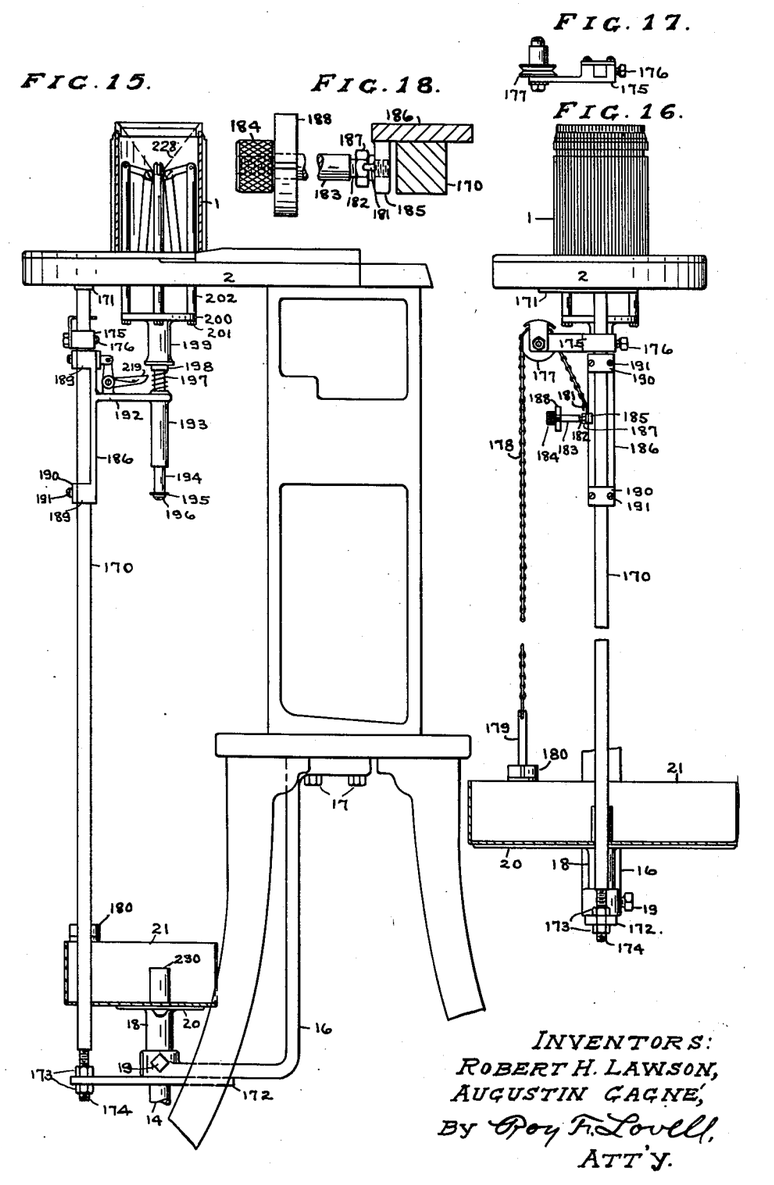
Fig. 15 is a view in front elevation showing the frame of a knitting machine, the needle cylinder in section, and the grab take-up in engagement with a transferred rib top.
Fig. 16 is a view in side elevation of the mechanism shown in Fig. 15.
Fig. 17 is a plan view of a detail.
Fig. 18 is an enlarged view, partly in section, showing a detail.
Figures 19, 20, 21:
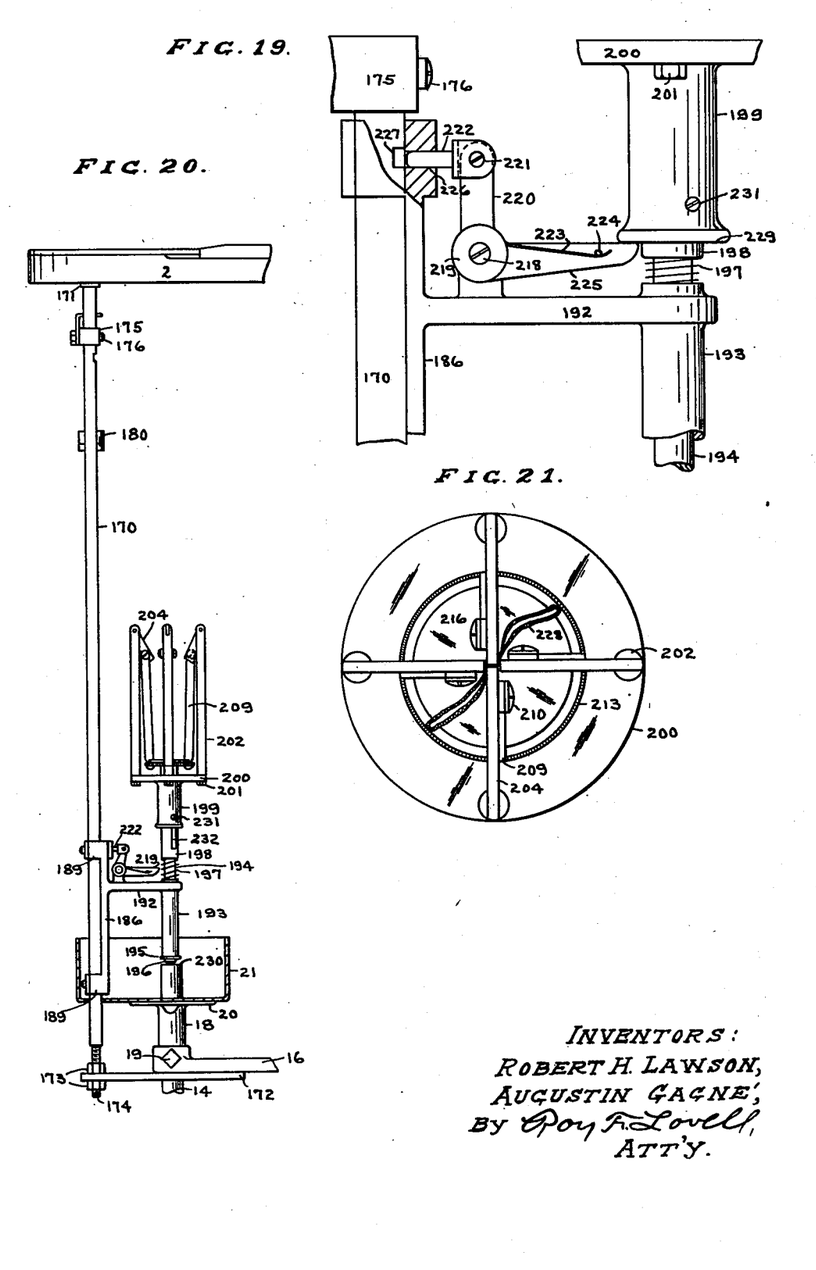
Fig. 19 is an enlarged view showing a portion of the mechanism shown in Fig. 15 but showing the position of the parts after the rib top has been transferred and the leg is being knitted.
Fig. 20 is a view similar to Fig. 15 but showing the grab take-up in the position it occupies at the completion of the knitting of a stocking.
Fig. 21 is a plan view of the grab take-up showing the same in the position shown in Fig. 15.

After the transfer ring bracket 5' has been moved to the positions shown in Figs. 1 and 2, the bracket 186 and parts carried thereby are raised from the position shown in Fig. 20 to the position shown in Figs. 15 and 16 by engaging the underside of the bracket 200, whereupon the pin 222 (Fig. 19), which is normally seated within a hole 226 provided in the upper portion of the bracket 186, snaps into a recess 227 provided in the upper portion of the rod 170, the forward movements of the pin 222 into the recess 227 being caused by the aforesaid coil spring 223. By elevating the bracket 200 the relative positions of the said bracket and the sleeve 198 shown in Fig. 22 are maintained, the spring 197 merely maintaining the sleeve 198 in the relative position shown in Fig. 22 not being of sufficient strength to cause the said sleeve 198 to move to the relative position, with respect to the bracket 200, shown in Fig. 23. With the pin 222 in engagement with the recess 227, the bracket 186 is temporarily locked or retained in the position shown in Figs. 1, 15 and 16. Immediately upon the pin 222 engaging in the recess 227, the bracket 200 is released, whereupon the weight of the same may cause it to move downward a slight distance, serrated ends 211 of the arms 204 thereupon moving to the position shown in Figs. 15 and 23, thereby gripping the fabric 228 and pulling the same off the quills or transfer points 6 and onto the needles 9. If the weight of the bracket 200 is not sufficient to move the same to the position shown in Fig. 19, the said bracket is moved to such position manually whereupon the lower face 229 of the sleeve 199 engages the upper face or edge of the arm 225 of the detent 219 and rocks the said detent upon its pivot 218, whereupon the pin 222 is withdrawn from the recess 227. Thereafter throughout the knitting of a stocking or other fabric the combined weights of the brackets 186 and 200, minus such counterbalancing weights 180 as may be provided, tend to hang upon the fabric 228 thereby acting as a take-up for the said fabric whereby stitches are maintained under constant tension and more uniform fabric is knitted.

At the completion of the knitting of the stocking or other fabric the brackets 186 and 200 have reached the position shown in Fig. 20, whereupon the screw head 196 engages the upper face of a post 230 which post is shown as a continuation of rod 14 and is carried by and forms part of the basket 21. The engagement between the screw 196 and post 230 causes the shaft 194 to be moved upwardly through the sleeve 193. Through the upper end of the shaft 194 (Figs. 22, 23 and 25) passes a pin or screw 231 which pin also passes through and longitudinally slides in slots 232 provided in the sleeve 198 and extending lengthwise thereof. One end of the pin or screw 231 is in threaded engagement with sleeve 199 of the bracket 200, thereby connecting the said bracket 200 with the rod or shaft 194, whereby longitudinal movements imparted to the shaft 194 are transmitted to the bracket 200. Thus the aforesaid engagement of the post 230 with the screw 196 causes the rod or shaft 194 to move from the position shown in Fig. 23 to that shown in Fig. 22, whereupon the serrated ends 211 of the arm 204 drop from the position shown in Fig. 23 and thus release their engagement with the fabric of the stocking or other fabric 228, whereupon the cycle of operation above described is repeated. In addition to providing a connection between the shaft or rod 194 and the bracket 200, the pin and slot connection 231, 232, functions circumferentially to position the plate 216 and thus maintain the slots or notches 215 therein in alignment with the corresponding or companion arms 209.

While the grab take-up mechanism hereinbefore described is shown as used in connection with other mechanism for transferring ribbed tops to the needles of a needle cylinder, nevertheless the take-up means may be used alone if desired.

Although in the foregoing description, certain of the elements and combinations of the same have been described in detail, nevertheless it is not the intention to limit the claims hereto appended otherwise than by the specific recitations in the claims themselves.

We claim:

1. Means for transferring fabric to the needles of a knitting machine, including transfer points, in combination with means for bodily moving the transfer points upon a vertical axis and also upon a horizontal axis, the movements of the transfer points upon the two axes causing the said points to be moved from an initial position where they are clear of the needles of a knitting machine and point upwardly to receive the stitches of a fabric, to a position over the needles of a knitting machine and with the transfer points extending in a downward direction.

2. Means for transferring fabric to the needles of a knitting machine, including transfer points, in combination with means for bodily moving the transfer points upon a vertical axis and also upon a horizontal axis, the movements of the transfer points upon the two axes causing the said points to be moved from an initial position where they are clear of the needles of a knitting machine and point upwardly to receive the stitches of a fabric, to a position over the needles of a knitting machine and with the transfer points extending in a downward direction, and means thereafter adapted to move the transfer points to an overlapping position with respect to the needles, whereby stitches may be transferred to the needles.

3. Transfer mechanism adapted to transfer fabric to the needles of a knitting machine, including a support adapted to be attached to the frame of the knitting machine, said support providing a bearing, a transfer ring so mounted as to swing upon a vertical axis and being supported for such movements in the aforesaid bearing, the transfer ring when swung upon the axis adapted to move to and from a position directly over the needles of a knitting machine, and means adapted, when the transfer ring is positioned directly over the needle cylinder, to move the points of the transfer ring to such a position that they overlap the said needles, whereby the latter may remove stitches from the points of the transfer ring.

4. Means for transferring fabric to the needles of a knitting machine including a ring having a circular series of transfer points mounted therein, means for supporting the ring, the supporting means being adapted to move upon a horizontal axis and thereafter upon a vertical axis, in combination with means for centering and holding the transfer ring so that the transfer ring will remain, either in such a position that the transfer points extend upwardly or in such a position that the said transfer points extend downwardly.

5. Means for transferring fabric to the needles of a knitting machine including transfer points and a support for the same, means for supporting the transfer points to swing on a vertical axis for movements to and from a position immediately above the needles of a knitting machine, in combination with means for centering the transfer points directly over their companion needles so that the stitches carried by the transfer points may be transferred to the needles.

6. Transfer means for transferring fabric to the needles of a knitting machine consisting of transfer points and a support for the same adapted to be moved on a vertical axis from one position to a position where the transfer points are directly over the needles of a knitting machine, the support for the transfer points, when the said transfer points move from the first named position to the second named position, being adapted by its movements automatically to lock the transfer points and needles in such relative positions that each transfer point registers with its companion needle.

7. A transfer ring in combination with a knitting machine having a rotary needle cylinder mounted therein, means for centering the needle cylinder with respect to the transfer ring, means for mounting the transfer ring in operative relation with respect to the needle cylinder of the knitting machine so that the transfer ring may transfer stitches of a fabric to the needles of a needle cylinder, such mounting permitting the transfer ring to swing in a horizontal plane, means movable with the transfer ring and other means adapted to hold the centering means out of operative relation with respect to the needle cylinder, the aforesaid means which is movable with the transfer ring adapted, when the transfer ring is moved, to release the centering means for the needle cylinder, whereby the centering means lock the needle cylinder in such a position that the transfer points and needles are in register so that stitches may be transferred to the needles.

8. A knitting machine having mounted therein a rotary needle cylinder in combination with a transfer ring, means for circumferentially adjusting the transfer ring with respect to the needle cylinder and means for moving the transfer ring to and from a position directly over the needles of the needle cylinder and with the transfer elements directed downwardly, from and to a position where the transfer elements project upwardly, the movement of the transfer ring to a position directly over the needles of the needle cylinder being on a vertical axis.

9. In combination: a knitting machine and means for transferring fabric to the needles thereof, the transfer means including points which are adapted to hold fabric loops, and means for causing the transfer points and needles to register so that fabric loops may be transferred from the points to the needles, and means adapted, when the points and needles register, to pull loops from the transfer points onto the needles, the said last named means thereafter adapted to tension the loops during the subsequent knitting of fabric.

10. A knitting machine including a needle cylinder, and means positioned within or beneath the needle cylinder said means being adapted to be moved longitudinally of the needle cylinder and by such movement to engage a fabric top and thereafter to complete the transfer of the same to the needles upon movement of the said means in a direction away from the loop engaging ends of the said needles.

11. A knitting machine including a needle cylinder and a base upon which the cylinder is mounted, in combination with a member carried by the base and depending therefrom, and means slidably mounted on the member to move to and from positions respectively within the needle cylinder and substantially spaced therefrom, detent means adapted to retain the aforesaid means in a position within the needle cylinder to engage and grip fabric carried by the needles.

12. A knitting machine including a needle cylinder and a base upon which the cylinder is mounted, in combination with a member carried by the base and depending therefrom, and means slidably mounted on the member to move to and from positions respectively within the needle cylinder and substantially spaced therefrom, detent means adapted to retain the aforesaid means in a position within the needle cylinder to engage and grip fabric carried by the needles, other means at the other extreme of movement of the aforesaid means adapted to release the engagement of the fabric by the aforesaid means.

13. A knitting machine having in combination: means for transferring fabric to the needles of the knitting machine, and means adapted to cooperate therewith including elements for automatically engaging the fabric thereby to complete the operation of transferring the fabric to the said needles, the said means last mentioned thereafter acting as a take-up for the knitted fabric.

ROBERT H. LAWSON.
AUGUSTIN GAGNÉ.